(12) United States Patent
Spinazze et al.

(10) Patent No.: US 8,911,194 B1
(45) Date of Patent: Dec. 16, 2014

(54) SOFTCAPTURE CRADLE

(75) Inventors: Paul A. Spinazze, Toledo, OH (US);
Gregory A. Meyer, Toledo, OH (US)

(73) Assignee: Tronair, Inc., Holland, OH (US)

( * ) Notice: Subject to any disclaimer, the term of this patent is extended or adjusted under 35 U.S.C. 154(b) by 1012 days.

(21) Appl. No.: 13/068,720

(22) Filed: May 18, 2011

(51) Int. Cl.
*B60B 29/00* (2006.01)

(52) U.S. Cl.
USPC .......................................... 414/427; 414/429

(58) Field of Classification Search
CPC ....... B60B 29/002; B60B 29/001; B64F 1/22; B66F 7/246
USPC .................................................. 414/427, 429
See application file for complete search history.

(56) References Cited

U.S. PATENT DOCUMENTS

| | | | |
|---|---|---|---|
| 4,036,384 A | 7/1977 | Johnson | |
| 4,121,788 A | 10/1978 | McMahon | |
| 4,225,279 A | 9/1980 | Boyer | |
| 5,051,052 A * | 9/1991 | Franken et al. | 414/428 |
| 5,054,714 A * | 10/1991 | Franken et al. | 244/50 |
| 5,151,003 A | 9/1992 | Zschoche | |
| 5,259,572 A * | 11/1993 | Franken et al. | 244/50 |
| 5,261,778 A | 11/1993 | Zschoche | |
| 5,302,075 A | 4/1994 | Zschoche | |
| 5,511,926 A | 4/1996 | Iles | |
| 6,305,484 B1 * | 10/2001 | Leblanc | 180/167 |
| 6,315,515 B1 * | 11/2001 | Young et al. | 414/563 |
| 6,357,989 B1 | 3/2002 | Iles | |
| 6,945,354 B2 * | 9/2005 | Goff | 414/429 |
| 7,275,753 B1 | 10/2007 | Ceccarelli et al. | |
| 2001/0038094 A1 * | 11/2001 | Lundy et al. | 254/1 |
| 2006/0056949 A1 * | 3/2006 | Eckert | 414/427 |
| 2014/0037409 A1 * | 2/2014 | Winters | 414/427 |

* cited by examiner

*Primary Examiner* — Saul Rodriguez
*Assistant Examiner* — Emery Hassan
(74) *Attorney, Agent, or Firm* — Emch, Schaffer, Schaub & Porcello Co., LPA

(57) ABSTRACT

This soft capture cradle is useful for moving an aircraft having a nose-wheel without contacting the strut, oleo or landing gear, only contacting the nose landing gear tire or wheel. The cradle comprises a front left capture gate; a front right capture gate; a forward motion safety bar; and a rear capture plate. A forward motion safety switch is connected to the forward motion safety bar. The switch is configured to disengage the throttle of an aircraft tug porter when the forward motion safety bar contacts the aircraft nose-wheel. The cradle also includes a means for moving the front left capture gate and front right capture gate between a cradle open position and a cradle closed position. The cradle further includes a means for moving the cradle between a cradle up position and a cradle down position. Still further, the cradle also has a gate lock and cradle locator safety switch configured to locate the cradle, configure to stop the "cradle down" movement when the cradle is lowered to the ground, and configured to prevent "cradle open" movement when the cradle is in the up position.

17 Claims, 4 Drawing Sheets

SOFTCAPTURE CRADLE

CROSS REFERENCE TO RELATED APPLICATION

The present patent application is based upon and claims the benefit of provisional patent application No. 61/295,972, filed May 20, 2010.

FIELD OF THE INVENTION

The present relates to a SOFTCAPTURE® cradle for use with an aircraft and a towing vehicle. More specifically, the cradle is used for moving an aircraft on the ground.

BACKGROUND OF THE INVENTION

Various devices have been used to move airplanes on the ground without starting the aircraft engine. One known system uses a towing vehicle having a tow bar which attaches to the axle of the aircraft nose-wheel. This tow bar system may disadvantageously require a separate tow bar or tow bar adapter for each different type of nose-wheel axle assembly. Furthermore, a new tow bar or adapter is required for each new aircraft design. Matching the correct tow bar or adapter to the correct aircraft is often a time consuming process, and valuable airport storage space is required to store all the various towbars and towbar heads.

Another known aircraft tug assembly includes a self-propelled chassis having a nose-wheel scoop mounted to the front of the chassis by a 3-point hitch. A manually or hydraulically operated winch is mounted to the chassis to pull the aircraft nose-wheel onto the nose-wheel scoop. This nose-wheel scoop requires a variety of different adapters to receive the various nose-wheel configurations. For example, some aircraft have a single nose-wheel, while others have a dual nose-wheel, that is two tires mounted side by side. Thus a need exists for improved nose-wheel cradles.

SUMMARY OF THE INVENTION

This soft capture cradle is useful for moving an aircraft having a nose-wheel. The cradle comprises a front left capture gate; a front right capture gate; a forward motion safety bar; and a rear capture plate.

A forward motion safety switch is connected to the forward motion safety bar. The switch is configured to disengage the throttle of an aircraft tug jet porter when the forward motion safety bar contacts the aircraft nose-wheel. The cradle also includes a means for moving the front left capture gate and front right capture gate between a cradle open position and a cradle closed position. The cradle further includes a means for moving the cradle between a cradle up position and a cradle down position. Still further, the cradle also has a gate lock and cradle locator safety switch configured to locate the cradle, configure to stop the "cradle down" movement when the cradle is lowered to the ground, and configured to prevent "cradle open" movement when the cradle is in the up position. The cradle still further includes an over steering protection safety system.

IN THE DRAWINGS

DESCRIPTION OF THE INVENTION

Figure 2:
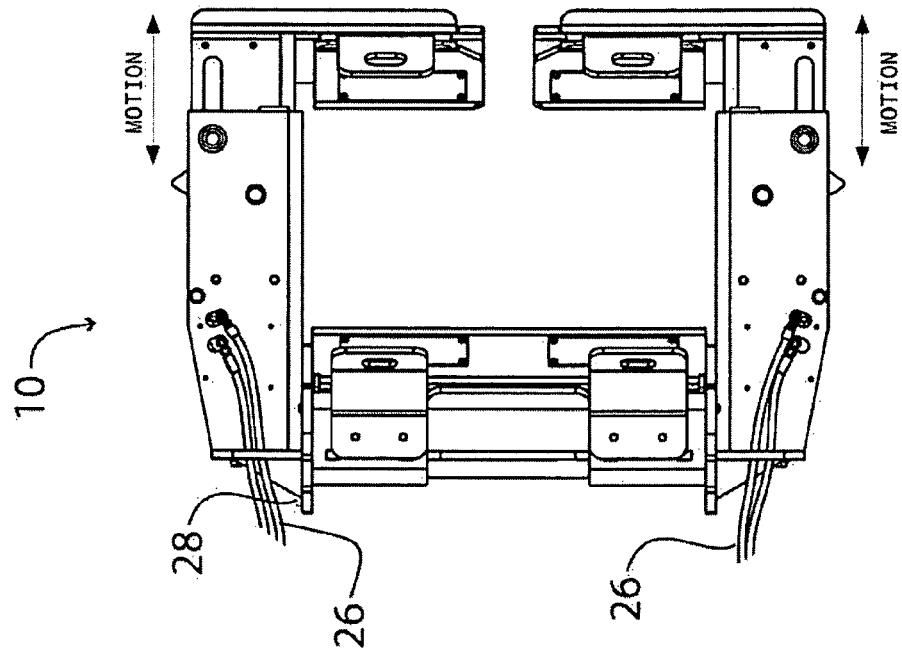
FIG. 2 is a top view of the soft capture cradle with the front capture gates in the forward position.
Figure 1:
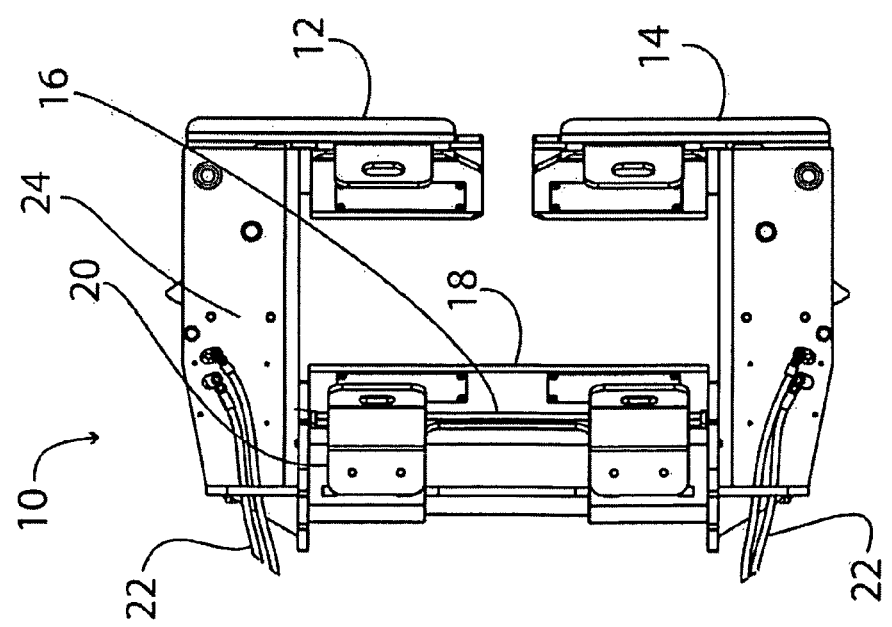
FIG. 1 is a top view of the soft capture cradle of this invention.

FIG. 1 is a top view of soft capture cradle 10 of this invention. Soft capture cradle 10 is useful for moving an aircraft having a nose-wheel. Cradle 10 comprises front left capture gate 12; front right capture gate 14; forward motion safety bar 16; and a rear capture plate 18. Forward motion safety switch 20 is connected to forward motion safety bar 16. Switch 20 is configured to disengage the throttle of an aircraft tug porter when forward motion safety bar 16 contacts the aircraft nose-wheel. Cradle 10 also includes means 22 for moving front left capture gate 12 and front right capture gate 14 between a cradle open position (FIG. 3) and a cradle closed position (FIG. 1). Cradle 10 further includes a means (FIG. 4) for moving the cradle between a cradle up position and a cradle down position. Still further, cradle 10 also has a gate lock and cradle locator safety switch 40 configured to locate cradle 10, configure to stop the "cradle down" movement when cradle 10 is lowered to the ground, and configured to prevent "cradle open" movement when cradle 10 is in the up position. Soft capture cradle assembly 10 further comprising a means for moving front left capture gate 12 and front right capture gate 14 between a rearward position and a forward position (FIG. 2). FIG. 1 also shows parking brake release safety switch 24 configured to allow the porter to roll during a segment of capture to prevent stress on aircraft nose landing gear.

FIG. 2 is a top view of soft capture cradle 10 with the front capture gates in the forward position. FIG. 2 also shows the motion and means 26 for moving front left capture gate 12 and front right capture gate 16 between a rearward position and a forward position. FIG. 2 also shows throttle speed safety switch 28 configured to reduce the porter speed when approaching an aircraft.

Figure 3:
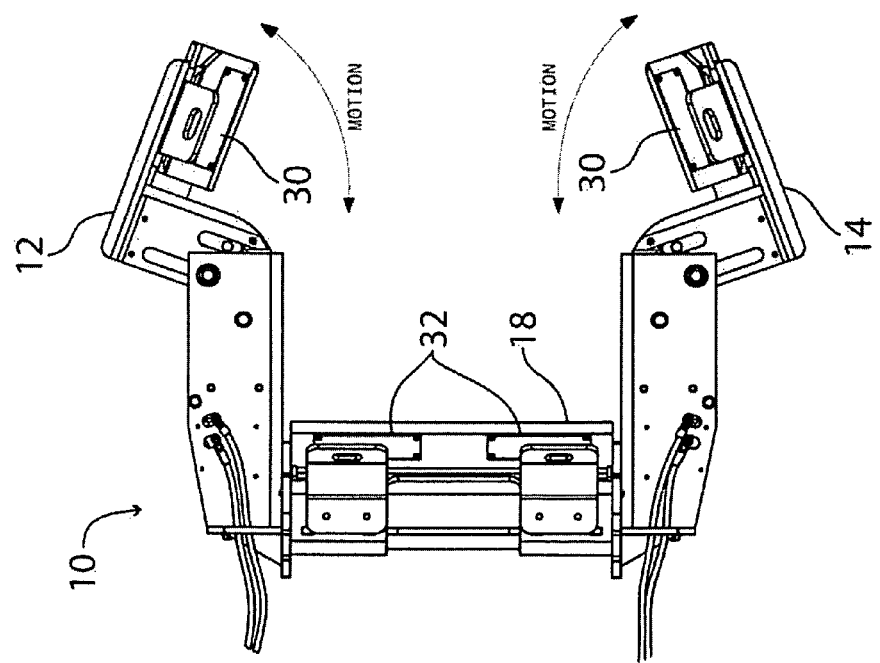
FIG. 3 is a top view of the soft capture cradle with the front capture gate in the open position.

FIG. 3 is a top view of soft capture cradle 10 with front capture gates 12 and 14 in the open position. FIG. 3 shows the rotation motion of front left capture gate 12 and front right capture gate 14 between a cradle open position and a cradle closed position. FIG. 3 also shows that front left capture gate 12 and front right capture gate 14 having anti-skid pads 30. FIG. 3 further shows rear capture gate 18 having anti-skid pad 32.

Figure 4:
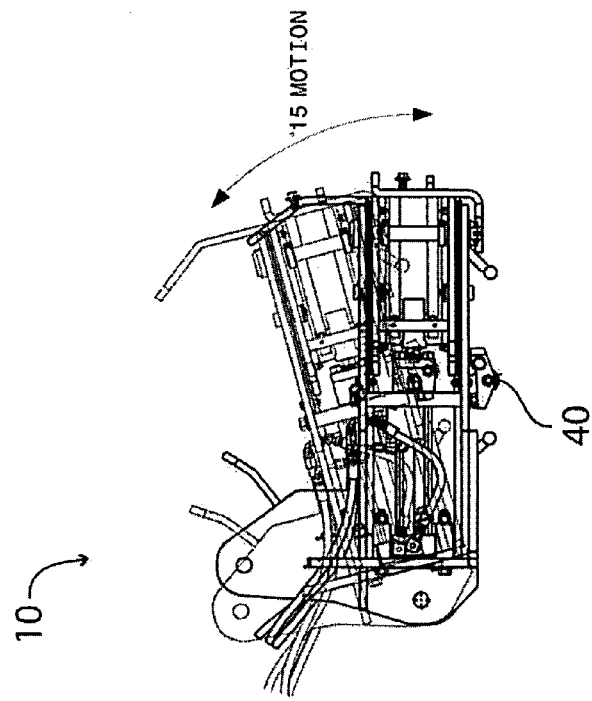
FIG. 4 is a side view showing the movement of the cradle between an up position and a down position.

FIG. 4 is a side view showing the movement of cradle 10 between an up position and a down position. FIG. 4 shows a 15° rotational movement between the positions. FIG. 4 also shows gate lock and cradle locator safety switch 40 which is configured to locate cradle 10, configured to stop the "cradle down" movement when cradle 10 is lowered to the ground, and configured to prevent "cradle open" movement when cradle 10 is in the up position.

Figure 5:
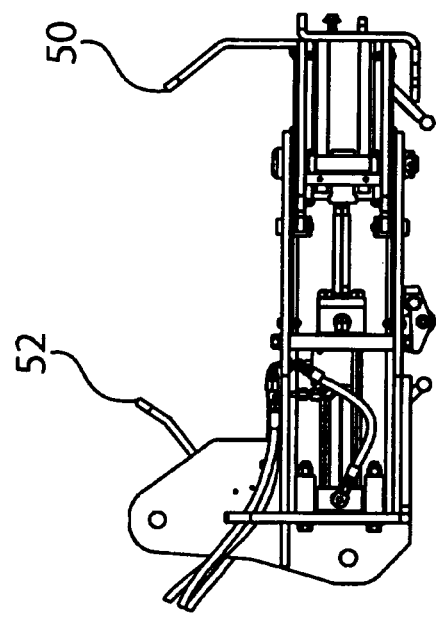
FIG. 5 is a side view of the cradle showing the front capture gates in a rearward position.

FIG. 5 is a side view of cradle 10 showing front capture gates in a rearward position. FIG. 5 shows front left capture gate 18 and front right capture gate 14 having front top restraint plates 50. FIG. 5 also shows rear capture gate 18 having right and left over steer switch 52.

Figure 6:
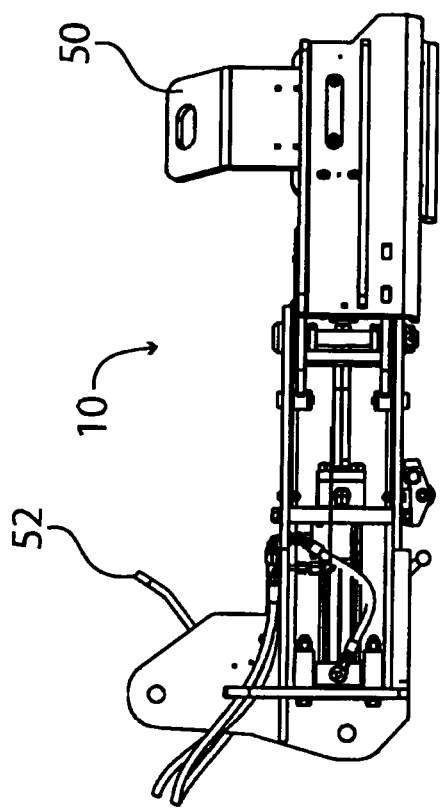
FIG. 6 is a side view of the cradle showing the front capture gates in an open position.

FIG. 6 is a side view of cradle 10 showing front capture gates 12 and 14 in an open position. FIG. 6 more clearly shows front top resistant plate 50.

Figure 7:
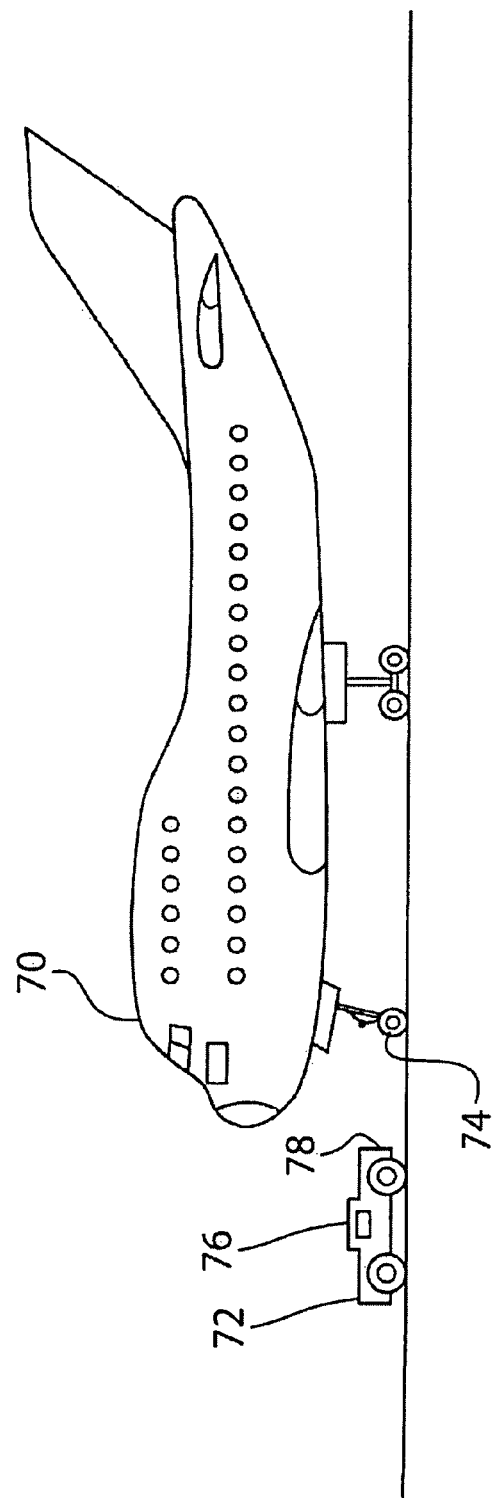
FIG. 7 is a general view showing an aircraft and a towing vehicle used with the cradle of this invention.

FIG. 7 is a general view showing aircraft 70 and towing vehicle (porter) 72 used with cradle 10 of this invention. Aircraft 70 has nose-wheel 74. Porter 72 comprises self-propelled chassis 76 controllable by an operator (not shown), with chassis 76 having front portion 78; and soft capture cradle assembly 10 attached to front portion 78 of porter 72.

Throttle speed safety switch 28 further is configured to limit the throttle to "creep speed" when cradle 10 is not tilted high enough for towing. In addition forward motion safety bar 16 and forward motion safety switch 20 are configured to work together to disengage the throttle when safety bar 16 contacts aircraft nose-wheel 74.

The system has a drive system, over loading system, power steering and suspension that allows the porter operator to connect to the aircraft nose landing gear from the driver's cockpit position or at the fender next to the aircraft nose landing gear. SOFTCAPTURE® provides capture of the aircraft without straps or without touching the oleo, the strut or any part of the nose landing gear. All contact is on made on the aircraft tires, not on the strut. Throttle speed safety switch reduces porter speed when approaching the aircraft. Forward motion safety switch disengages the throttle when the forward motion safety bar contacts the aircraft nose-wheel. This prevents the operator from running into the nose wheel. The gate lock and cradle locator safety switch locates the cradle and stops the "cradle down" movement when the cradle is lowered to the ground. The gate lock prevents "cradle open" movement when the cradle is up. The parking brake release safety switch allows the porter to roll during a segment of capture to prevent stress on the aircraft nose landing gear. The hydraulic foot brake remains functional during the operation. Designed to fit most common dual nose-wheel regional aircraft. Single nose-wheel adapters are currently being developed. The over steer protection system 52 utilizes two sensing pads to detect when the aircraft could be in an over steering situation and indicating lights and horn to notify the operator.

SOFTCAPTURE® FUNCTION: The porter is driven to within 2 feet of the aircraft nose landing gear. The "CRADLE DOWN" button is pressed until cradle movement stops. The 'CRADLE OPEN" button is pressed until cradle movement stops. The porter is driven up to the nose landing gear (the speed is limited to a preset creep speed) until the forward motion safety bar touches the nose-wheel and disengages the throttle. The "CRADLE CLOSE" button is pressed until cradle motion stops. The "CRADLE UP" button is pressed until cradle motion stops. Now you can tow the aircraft safely.

SOFTCAPTURE® Safety Switch Functions: The throttle speed safety switch limits the throttle to "creep speed" when the cradle is not tilted high enough for towing. The gate lock safety switch stops "cradle open" movement when the cradle is not lowered to the ground. The forward motion safety bar and the forward motion safety switch work together to disengage the throttle when the safety bar contacts the aircraft nose-wheel. The parking brake release safety switch releases the parking brake during cradle motion (UP, DOWN, OPEN, CLOSE) except when the capture gates are swung open. This eliminates pressure on the nose landing gear by allowing the porter to roll while the aircraft main landing gear is chocked.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A soft capture cradle useful for moving an aircraft having a nose wheel, the cradle comprising:
   a front left capture gate;
   a front right capture gate;
   a forward motion safety bar;
   a rear capture plate;
   a forward motion safety switch connected to the forward motion safety bar configured to disengage the throttle of an aircraft tug porter when the forward motion safety bar contacts the aircraft nose-wheel;
   a means for moving the front left capture gate and front right capture gate between a cradle open position and a cradle closed position;
   a means for moving the cradle between a cradle up position and a cradle down position; and
   a gate lock and cradle locator safety switch configured to locate the cradle, configured to stop the "cradle down" movement when the cradle is lowered to the ground, and configured to prevent "cradle open" movement when the cradle is in the up position.

2. A soft capture cradle assembly according to claim 1 further comprising a means for moving the front left capture gate and the front right capture gate between a rearward position and a forward position.

3. A soft capture cradle assembly according to claim 1 further comprising a throttle speed safety switch configured to reduce the porter speed when approaching an aircraft.

4. A soft capture cradle assembly according to claim 1 further comprising a parking brake release safety switch configured to allow the porter to roll during a segment of capture to prevent stress on aircraft landing gear.

5. A soft capture cradle assembly according to claim 3 wherein the throttle speed safety switch further is configured to limit the throttle to "creep speed" when the cradle is not tilted high enough for towing.

6. A soft capture cradle assembly according to claim 1 wherein the forward motion safety bar and the forward motion safety switch are configured to work together to disengage the throttle when the safety bar contacts the aircraft nose-wheel.

7. A soft capture cradle assembly according to claim 4 wherein the parking brake release safety switch further is configured to release the parking brake during cradle motion (UP, DOWN, OPEN, CLOSE) except when the capture gates are swung open.

8. A soft capture cradle assembly according to claim 1 wherein the front left capture gate and the front right capture gate further comprise anti-skid pads.

9. A soft capture cradle assembly according to claim 1 wherein the front left capture gate and the front right capture gate further comprise front top restraint plates.

10. A soft capture cradle assembly according to claim 1 wherein the rear capture gate further comprises an anti-skid pad.

11. A soft capture cradle assembly according to claim 1 wherein the rear capture gate further comprises a rear top restraint bar.

12. A soft capture cradle assembly according to claim 1 further comprising an over load system.

13. A soft capture cradle assembly according to claim 1 further comprising an over steer sensing system.

14. A soft capture cradle assembly according to claim 13 wherein the over steer system further comprise a sensing switch pad and indicating system.

15. A soft capture cradle assembly according to claim 13 wherein the over steer system comprises right and left sensing pads.

16. A soft capture cradle assembly according to claim 1 wherein the rear capture gate further comprises an over steer sensing system.

17. An aircraft tug assembly for moving an aircraft having a nose wheel, the tug assembly comprising:
- a self-propelled chassis controllable by an operator, with the chassis having a front portion; and
- a soft capture cradle assembly according to claim 1 attached to the front portion of the aircraft tug assembly.

* * * * *